US010691380B2

(12) United States Patent
Nishida

(10) Patent No.: US 10,691,380 B2
(45) Date of Patent: Jun. 23, 2020

(54) PRINT SERVER, METHOD FOR CONTROLLING THE SAME, AND STORAGE MEDIUM

(71) Applicant: CANON KABUSHIKI KAISHA, Tokyo (JP)

(72) Inventor: Takahiko Nishida, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/298,798

(22) Filed: Mar. 11, 2019

(65) Prior Publication Data

US 2019/0286377 A1 Sep. 19, 2019

(30) Foreign Application Priority Data

Mar. 15, 2018 (JP) ................. 2018-048252

(51) Int. Cl.
*G06F 3/12* (2006.01)

(52) U.S. Cl.
CPC ............ *G06F 3/122* (2013.01); *G06F 3/1205* (2013.01); *G06F 3/1247* (2013.01); *G06F 3/1286* (2013.01); *G06F 3/1287* (2013.01)

(58) Field of Classification Search
CPC ...... G06F 3/122; G06F 3/1286; G06F 3/1287; G06F 3/1247; G06F 3/1205
USPC ...................................... 358/1.15
See application file for complete search history.

(56) References Cited

U.S. PATENT DOCUMENTS

| 9,460,436 | B2* | 10/2016 | Ovick | G06Q 20/40 |
| 9,858,694 | B1* | 1/2018 | Das | G06T 11/203 |
| 9,922,338 | B2* | 3/2018 | Ovick | G06Q 30/0225 |
| 10,053,236 | B1* | 8/2018 | Buchmueller | G01N 29/4454 |
| 2010/0329454 | A1* | 12/2010 | Takashima | H04L 9/3073 380/44 |
| 2015/0135300 | A1* | 5/2015 | Ford | G06F 16/93 726/11 |
| 2015/0163206 | A1* | 6/2015 | McCarthy | G06F 21/6227 713/171 |
| 2015/0178729 | A1* | 6/2015 | Kuo | G06Q 20/02 705/44 |
| 2018/0013735 | A1* | 1/2018 | Guo | H04L 9/14 |

FOREIGN PATENT DOCUMENTS

JP 2017-33143 A 2/2017

* cited by examiner

*Primary Examiner* — Tammy Paige Goddard
*Assistant Examiner* — Darryl V Dottin
(74) *Attorney, Agent, or Firm* — Canon U.S.A., Inc. I.P. Division

(57) ABSTRACT

A print server is provided such that, in a case where a determination unit determines that a first condition and a second condition are identical, a management unit manages acquisition sources of print data files generated based on a first printing request, the acquisition sources including reissued second signature information.

14 Claims, 10 Drawing Sheets

FIG.4

```
{
"dataList" : [],
"end" : false
}
```
~400

```
{
"dataList" : [
 "https://storage.com/Jobs/job-001/data-1.pdl?sign=vuEe9xqC"
],
"end" : false
}
```
~410

```
{
"dataList" : [
  "https://storage.com/Jobs/job-001/data-1.pdl?sign=vuEe9xqC",
  "https://storage.com/Jobs/job-001/data-2.pdl?sign=pnm8QCLX"
],
"end" : false
}
```
~420

```
{
"dataList" : [
  "https://storage.com/Jobs/job-001/data-1.pdl?sign=vuEe9xqC",
  "https://storage.com/Jobs/job-001/data-2.pdl?sign=pnm8QCLX",
  "https://storage.com/Jobs/job-001/data-3.pdl?sign=MTBegECc"
],
"end" : true
}
```
~430

```
{
"dataList" : [
   "https://storage.com/Jobs/job-002/data-1.pdl?sign=su3btgFi8"
   "https://storage.com/Jobs/job-002/data-2.pdl?sign=Kg3RUg9A"
   "https://storage.com/Jobs/job-002/data-3.pdl?sign=tRo8E1Xd"
],
"end" : true
}
```
~440

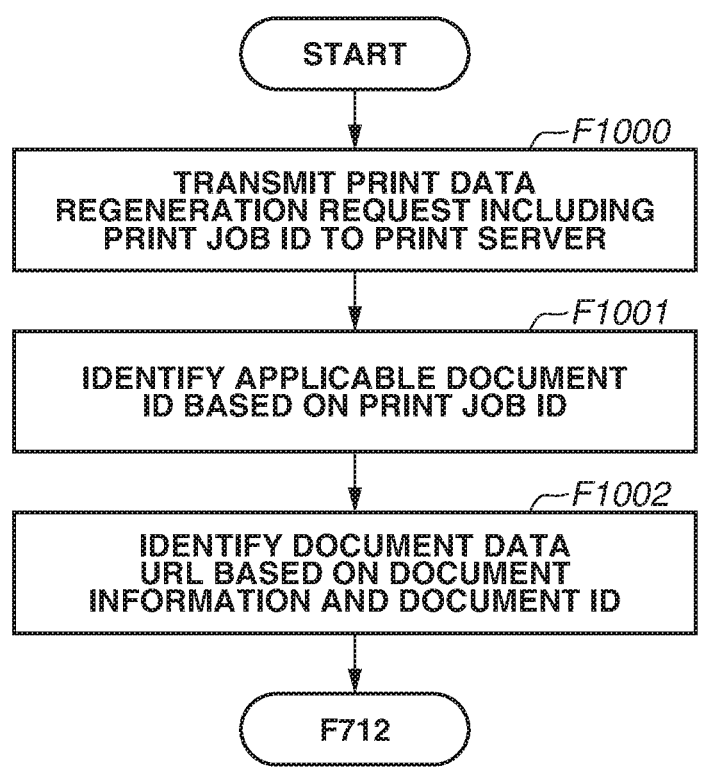

PRINT SERVER, METHOD FOR CONTROLLING THE SAME, AND STORAGE MEDIUM

BACKGROUND

Field

The present disclosure relates to a print server for instructing a printer to print downloaded print data, a method for controlling the print server, and a storage medium.

Description of the Related Art

In recent years, there has been provided business of offering cloud services by using a virtual server on a cloud system. Examples of service contents include storage services for storing data in file formats and database services for offering database functions.

As a certain form of implementing a printing system, print services and data conversion services are offered which use a virtual server on a cloud system. In this case, as its advantage, management of a hardware print server is not necessary for each customer. In addition, there is another advantage that computing resources can be easily added in accordance with the load on the virtual server.

With the spread of such cloud services, pull print environments where printers acquire print data from a cloud system via the Internet are becoming popular. In a pull print environment, document data processing is performed in a distributed way by a cloud system using many computing resources, which allows simultaneous processing of requests made from many clients. To manage print data through the cloud system, data conversion functions of converting data into data formats interpretable by diverse types of printers are required on the cloud system side. Data conversion functions are functions which conventionally perform data conversion by using data conversion drivers of client terminals. In the cloud services, such functions are implemented on a cloud system.

In another form, print data generated by data conversion processing is divided to generate print data files and arranged on a storage server. A printer acquires print data based on an index file describing the Uniform Resource Locator (URL) of each print data file. In an image forming apparatus discussed in Japanese Patent Application Laid-Open No. 2017-33143, a printer can quickly start printing (first printing) by performing print processing based on received print data files.

SUMMARY

According to an aspect of the disclosure, a print server for converting document data into print data including a plurality of print data files includes a management unit configured to manage a first condition designated by a first printing request for performing print processing for the document data, and acquisition sources for acquiring print data files generated based on the first printing request, the acquisition sources including first signature information, and a determination unit configured to determine whether the first condition is identical to a second condition designated by a newly received second printing request. When the determination unit determines that the first and the second conditions are identical, the management unit manages acquisition sources of the print data files generated based on the first printing request. The acquisition sources include reissued second signature information.

Further features will become apparent from the following description of exemplary embodiments with reference to the attached drawings.

BRIEF DESCRIPTION OF THE DRAWINGS

FIG. 4 illustrates examples of index files.

FIG. 10 is a flowchart illustrating print data regeneration request processing according to a fourth exemplary embodiment.

DESCRIPTION OF THE EMBODIMENTS

When a cloud system performs data conversion processing, many computing resources are used by the cloud system. As a method for efficiently using limited resources, a method for reusing once generated print data is provided.

In order to prevent print data from being misused, signature information which sets an expiration date, is supplied to Uniform Resource Locators (URLs) of print data files described in an index file. More specifically, if the expiration date of the URLs of print data files has expired, the print data cannot be acquired when an attempt is made to reuse the print data.

The present disclosure is directed to efficiently using resources of a storage server by reusing print data files in which signature information is given to the URLs.

A first exemplary embodiment will be described below with reference to the accompanying drawings.

<System Configuration>

Figure 1:
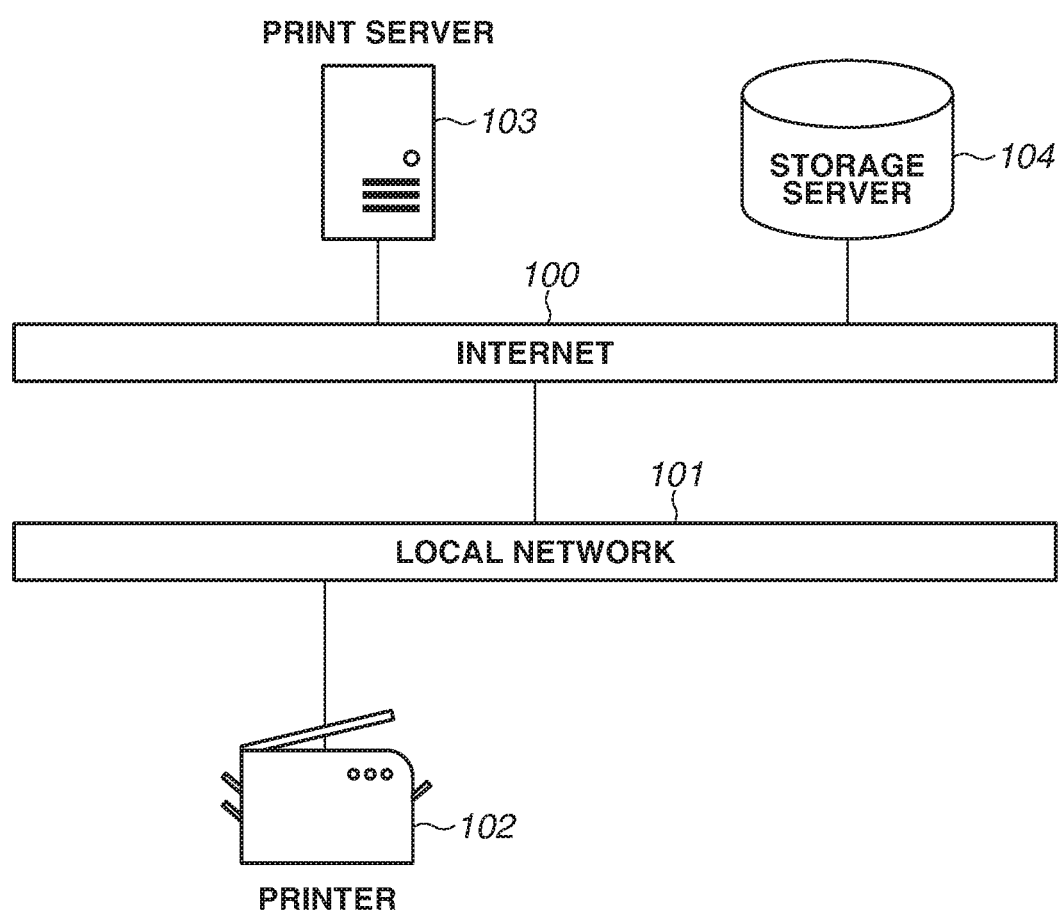
FIG. 1 illustrates an overall configuration of a print system.

FIG. 1 illustrates an overall configuration of a print system according to exemplary embodiments. Referring to FIG. 1, a printer 102 connected to a local network 101 via a wired or wireless local area network (LAN) can access the Internet 100 via the local network 101 to access a print server 103 and a storage server 104. The printer 102 incorporates an environment for executing programs for accessing the print server 103 and the storage server 104 to perform printing, such as a pull print application.

The print server 103 manages document information and print information and generates print data. According to the present exemplary embodiment, print data generated based on a printing request from the printer 102 is placed in the storage server 104, and the print server 103 instructs the printer 102 to acquire the print data to implement printing.

The storage server 104 performs file management and receives a file uploading/downloading request from the print server 103 and a file downloading request from the printer 102 through a URL access including a signature.

\<Hardware Configuration\>

Figure 2:
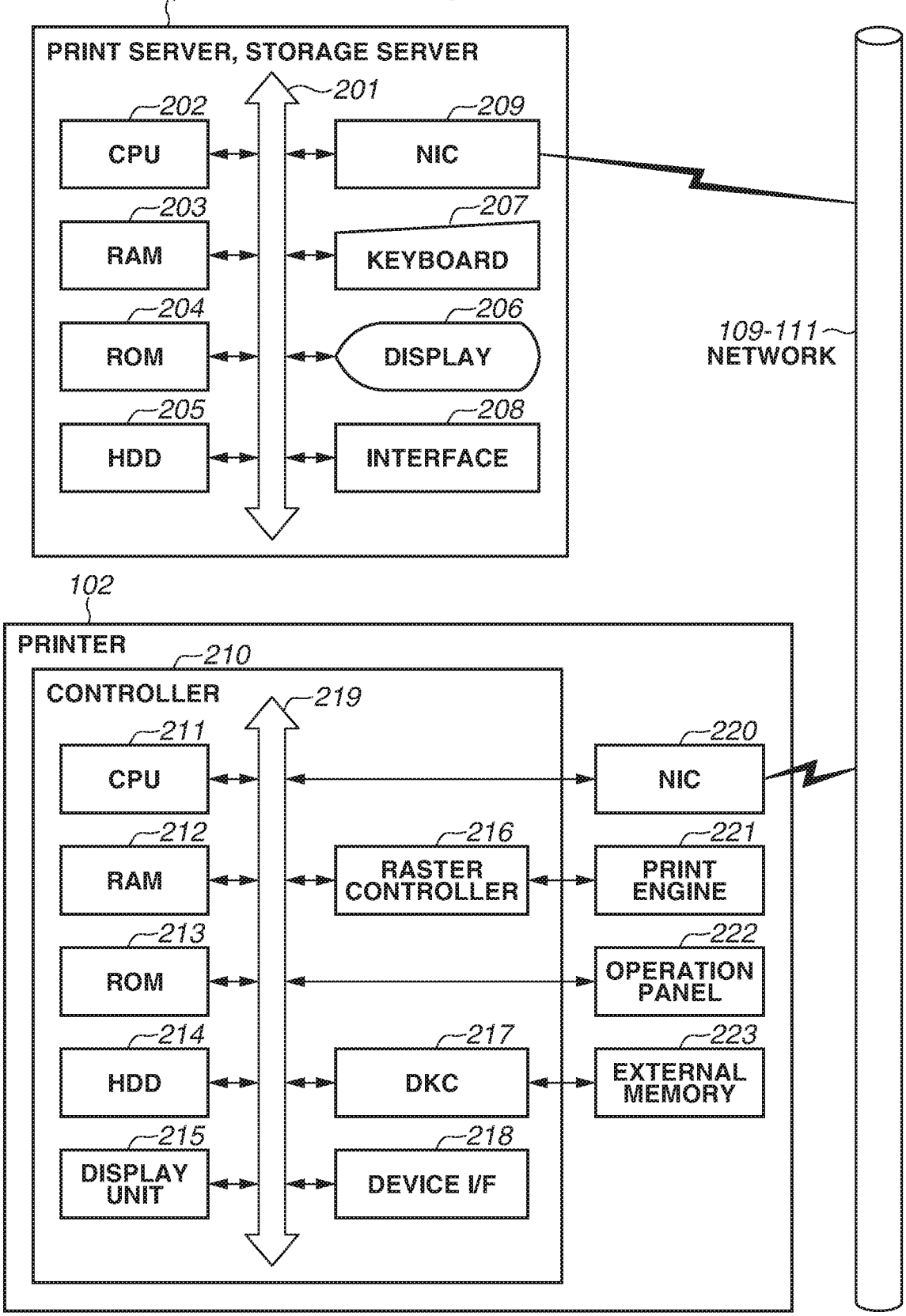
FIG. 2 illustrates hardware configurations of a print server, a storage server, and a printer.

FIG. 2 illustrates hardware configurations of the print server 103, the storage server 104, and the printer 102 according to exemplary embodiments. First, the hardware configurations of the print server 103 and the storage server 104 will be described below. For the convenience of descriptions, the print server 103 will be described below.

The CPU 202 controls the print server 103, executes an application program and an operating system (OS) stored in a hard disk drive (HDD) 205, and performs control to temporarily store information and files required for program execution in a random access memory (RAM) 203. A read only memory (ROM) 204 as a storage unit stores programs including basic input/output (I/O) programs, print data to be used for print processing, and other various data such as printer information.

The RAM 203 is a temporary storage unit and functions as the main memory of the CPU 202 and a work area. The HDD 205 is one of external storage units and functions as a mass storage memory. The HDD 205 stores print server programs, storage server programs, OS, various drivers, and related programs. A display 206 displays commands input from a keyboard 207, screen outputs of applications, and the status of the printer 102.

An interface 208 serves as an external apparatus interface (I/F) for connecting the printer 102, a universal serial bus (USB) device, and a peripheral device. A system bus 201 manages the data flow in the print server 103. A Network Interface Card (NIC) 209 exchanges data with an external apparatus via networks 109 to 111. The above-described computer configuration is to be considered as illustrative and is not limited to the example configuration illustrated in FIG. 2. For example, the storage destination of data and programs can be changed to the ROM 204, the RAM 203, and the HDD 205 according to their features.

A hardware configuration of the printer 102 will be described below. However, the CPU, RAM, ROM, HDD, and NIC within the printer 102 have the same basic functions as those described above, and detailed descriptions thereof will be omitted.

A controller 210 serves as a control system of the printer 102. A CPU 211 totally controls access to various devices connected to a system bus 219. This control is based on control programs stored in a ROM 213 or in an external memory 223 connected via a disk controller (DKC 217). A RAM 212 functions as the main memory of the CPU 211 and a work area, and is configured to be able to extend the memory capacity by using an optional RAM connected to an extension port (not illustrated). An HDD 214 stores print control programs and related programs. An operation panel 222 is provided with user interfaces and buttons for performing print operations. The operation panel 222 is also provided with buttons and a display unit 215 such as a liquid crystal panel and a light emitting diode (LED) display which are used to set the operation mode of the printer 102, display the operating status of the printer 102, and perform an operation such as copy designation. A print engine 221 uses a known printing technique, and includes, as examples of suitable embodiment systems, the electrophotographic system (laser beam system), ink-jet system, and sublimation (thermal transfer) system. A raster controller 216 converts print data written in the Page Description Language (PDL) or Program Development System (PDS) language, into image data. A device I/F 218 serves as a connection I/F for connection with an external device connectable via the USB.

\<Software Configuration and Management Information in Various Devices\>

Figure 3:
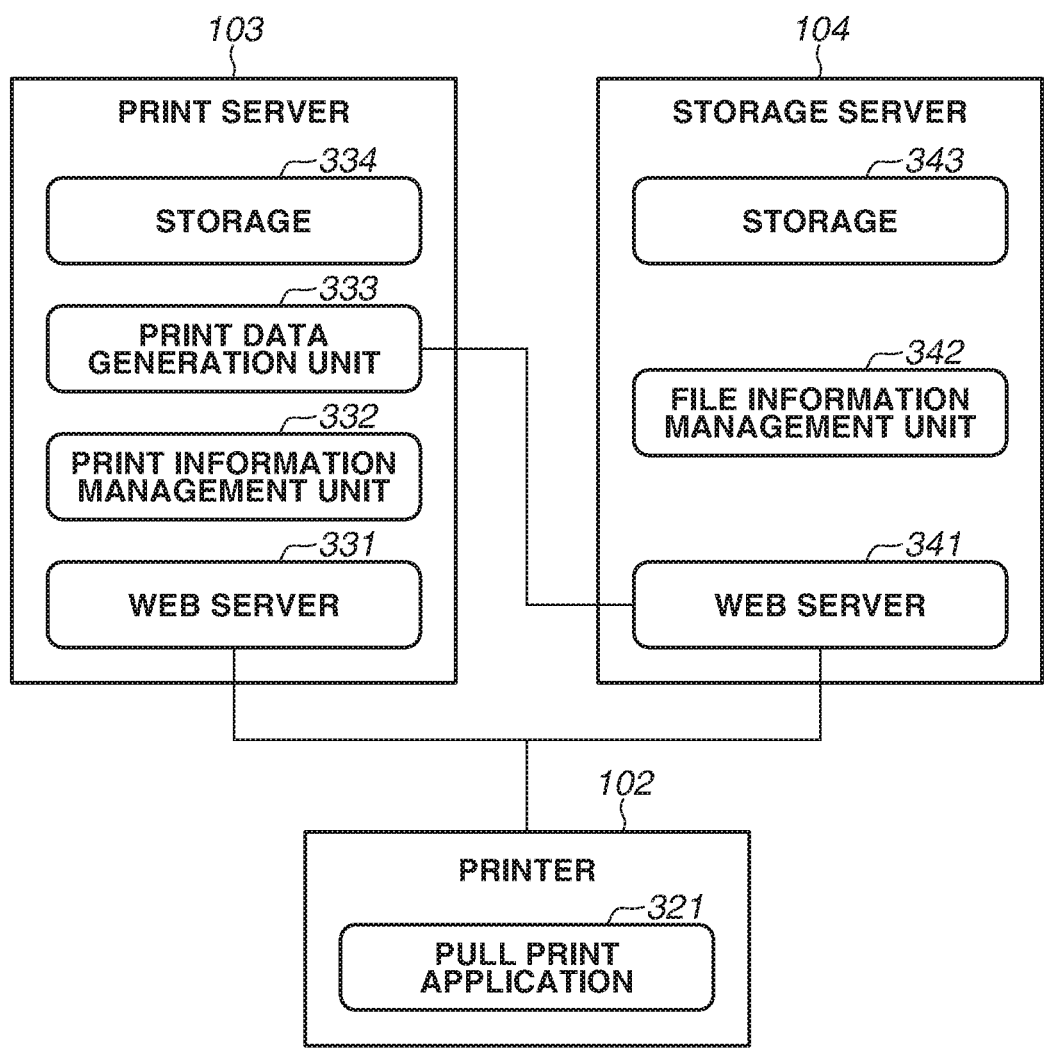
FIG. 3 illustrates software configurations of the print server, the storage server, and the printer.

Software configurations of the printer 102, the print server 103, and the storage server 104, and management information handled by these apparatuses will be described below with reference to FIG. 3.

The printer 102 includes a pull print application 321 stored in the HDD 214. The pull print application 321 is loaded into the RAM 212 and executed by the CPU 211.

In response to an input operation performed on the operation panel 222 by a user, the pull print application 321 acquires printing-related information from the print server 103 and displays the information on the display unit 215. The printing-related information includes status information for each piece of processing (described below). For example, in a time period between processing for transmitting a printing request and processing for accessing an index file, a status "Waiting for Printing" is displayed. When downloading of print data is started, a status "Printing In Progress" is displayed. Upon completion of the print processing, a status "Printing Completed" is displayed. In this way, the pull print application 321 can display the progress of processing (described below).

The pull print application 321 further transmits a printing-related request to the print server 103. Then, based on the information acquired from the print server 103, the pull print application 321 acquires print data from the storage server 104 and transmits the acquired print data to the print engine 221 to perform printing.

The print server 103 includes a web server 331, a print information management unit 332, a print data generation unit 333, and a storage 334. Various functions stored in the HDD 205 are loaded into the RAM 203 and executed by the CPU 202.

The web server 331 offers various interfaces of the print server 103, receives a printing request and a print job information acquisition request (step S5.3.0 described below) from the printer 102, and transmits a response to the printer 102 which is a request transmission source. The storage 334 stores print data information.

Table 1 illustrates an example of document information managed by the print information management unit 332 and stored in the storage 334 of the print server 103.

TABLE 1

| Document ID | Document Data URL |
| --- | --- |
| doc-A | https://storage.com/docs/doc-A/data.pdf |
| doc-B | https://storage.com/docs/doc-B/data.pdf |

"Document ID" denotes document identification (ID) information which enables the user to uniquely identify document information. "Document Data URL" denotes a URL for accessing document data stored in the storage server 104. The print data generation unit 333 (described below) of the print server 103 can acquire document data by accessing the document data URL.

Table 2 illustrates an example of print job information managed by the print information management unit 332 and stored in the storage 334 of the print server 103.

TABLE 2

| Print Job ID | Document ID | Printing Attributes | Index File URL | Request Hash Value |
|---|---|---|---|---|
| job-001 | doc-A | {"size"="A4", "color"="BW", ...} | https://storage.com/Jobs/job-001/index.json | EA84ABCFF88DDB |
| job-002 | doc-A | {"size"="A4", "color"="BW", ...} | https://storage.com/Jobs/job-002/index.json | — |
| job-003 | doc-B | {"size"="A3", "color"="CL", ...} | https://storage.com/Jobs/job-003/index.json | WE9HN70SEA8WEO |

"Print Job ID" denotes an ID which enables the user to uniquely identify print processing. This ID is issued by the print information management unit 332 when the web server 331 receives a printing request from the printer 102. "Document ID" denotes an ID which identifies document information. This ID is received by the web server 331 together with a printing request from the printer 102. "Index File URL" denotes a URL for accessing an index file. This URL is generated when the print data generation unit 333 starts print data generation processing.

"Request Hash Value" denotes a hash value generated based on a printing condition designated in a printing request. According to the present exemplary embodiment, "Request Hash Value" is a hash value generated based on a document ID and printing attributes designated as a printing condition in a printing request. The print information management unit 332 compares a request hash value calculated from a new printing request received with the request hash value managed in Table 2 to confirm whether the printing request is identical. Therefore, the hash value is calculated based on factors affecting the generation of print data and, according to the present exemplary embodiment, is calculated based on the document ID and printing attributes. MD5, SHA1, SHA256, CRC, and other algorithms are used for hash calculation.

The printing attributes included in a printing request serve as print setting information which is referenced by the print data generation unit 333 when generating print data. Examples of printing attributes include the paper size, page layout, two-side printing, and color mode. More specifically, the printing attributes serve as setting information set when performing print setting, and as attribute information affecting the generation of print data. The print data generation unit 333 generates print data according to the printing attributes.

The print data generation unit 333 identifies document information by using the document ID included in a printing request and acquires print target document data by accessing the document data URL. Then, the print data generation unit 333 generates print data by using the printing attributes included in the printing request. In this case, the print data generation unit 333 generates divided print data and uploads the divided print data to the storage server 104. Hereinafter, data generated by dividing print data is referred to as print data files.

When the web server 331 receives a print job information acquisition request together with the print job ID from the printer 102, the print information management unit 332 transmits the print job information identified by the print job ID to the printer 102.

The storage server 104 includes a web server 341, a file information management unit 342, and a storage 343. Various functions stored in the HDD 205 are loaded into the RAM 203 and executed by the CPU 202.

The web server 341 has a function of offering various interfaces of the storage server 104. The file information management unit 342 has a function of managing file information and performing file input/output operations in response to a request received by the web server 341. The storage 343 has a function of storing file information and a file received by the storage server 104. Table 3 illustrates an example of file information. A file stored in the storage server 104 includes document data and print data files generated from the document data, and an index file as an acquisition source of the print data files. Table 3 illustrates examples "/docs/doc-A/data.pdf" and " . . . docs/doc-B/data.pdf" as file paths of document data files, examples "/Jobs/job-001/data-1.pdl" and " . . . Jobs/job-001/data-2.pdl" as file paths of print data files, and an example "/Jobs/job-001/index.json" as the file path of an index file.

TABLE 3

| Data URL | File Path |
|---|---|
| https://storage.com/docs/doc-A/data.pdf | /docs/doc-A/data.pdf |
| https://storage.com/docs/doc-B/data.pdf | /docs/doc-B/data.pdf |
| https://storage.com/Jobs/job-001/index.json | /Jobs/job-001/index.json |
| https://storage.com/Jobs/job-001/data-1.pd1 | /Jobs/job-001/data-1.pd1 |
| https://storage.com/Jobs/job-001/data-2.pd1 | /Jobs/job-001/data-2.pd1 |

"Data URL" denotes the acquisition source of each file stored in the storage server 104. "File Path" denotes the storage destination of each file on the storage 343. The web server 341 receives a request for the data URL, and the file information management unit 342 updates the applicable file information and operates a file in the storage 343. For example, when a client transmits a request for the HTTP GET method to the data URL, the applicable file is downloaded. In addition, when a client transmits a request for the HTTP PUT method with an attached file to the data URL, the applicable file is uploaded and stored. Further, when a client transmits a request for the HTTP DELETE method to the data URL, the corresponding file can be deleted.

The storage server 104 has a function of issuing a data URL including a signature (hereinafter referred to as a signed URL). By informing a third party of URL, the storage server 104 can permit the third party to access the file of the URL. An expiration date is set to signature information (described below) supplied to a URL and is managed by the storage server 104.

The pull print application 321 of the printer 102 can access the storage server 104 by using the signed URL to download various data. From the viewpoint of security, if an expiration date, which is designated when the signed URL is issued, has expired, the print server 103 can no longer access the applicable file by using the signed URL. Unless otherwise specifically noted, a URL for acquiring various data is the signed URL having the expiration date issued by the storage server 104.

<Index File>

An index file generated and updated when the print server 103 generates print data files will be described below with reference to FIG. 4.

FIG. 4 illustrates examples of index files 400 to 430. First, when print data processing is started, the print server 103 generates the index file 400 in the storage server 104. According to the present exemplary embodiment, an index file employs the JSON file format and includes a list of print data file URLs as a result of processing using "dataList" as a key, and a processing completion flag using "end" as a key.

According to the present exemplary embodiment, print data files are PDL files, and the file output unit of print data files is divided in a predetermined fixed data size by the print server 103. However, the file output unit does not need to be divided in a fixed data size and may be changed for each file generation. In addition, as long as controllable by the print data generation unit 333, the print data can be output in any desired format, for example, in page count units (instead of data size units) or in output variable units. The following exemplary embodiments will be described on the premise that three different print data files (Pdl01-1, Pdl01-2, and Pdl01-3) have been generated.

Processes for generating and updating an index file along with the generation of print data files will be described below with reference to the index files 400 to 430. When the print server 103 starts the print data generation processing, the print server 103 generates the index file 400. Since no print data file has been generated at this timing, no data item is displayed in "dataList" in the index file 400. The value of "end" which indicates the processing result is "false".

Then, the print server 103 performs the print data generation processing and uploads generated print data files to the storage server 104. Then, the data URLs of the print data files are added to "dataList" of the index files 410 to 430. The index file 410 is an example of an index file when the first print data file is uploaded, and the index file 420 is an example of an index file when the second print data file is uploaded. The data URLs of print data files uploaded to the storage server 104 are added to "dataList" of the index file. In addition, signature information is applied to the added data URL. For example, "sign=vuEe9xqC" is added as signature information at the end of the data URL of the first print data file. Signature information to be applied to the URL needs to be a random token and is described based on an algorithm predetermined by the storage server 104.

Upon completion of the print data generation processing (i.e., when all print data files have been generated), the print server 103 updates the status of the index file when the third print data file as the last print data file is uploaded. The index file 430 is an example of an index file of which the status has been updated. The data URL of the third print data file has been added to "dataList" in the index file 430, and the value of the processing completion flag "end" is changed from "false" to "true".

When the printer 102 acquires and references the index files 400 to 430, the printer 102 can recognize the progress of the print data generation processing. Then, the printer 102 can download and print the generated print data files. The above descriptions have presented an account of the processing for generating and updating an index file.

When the printer 102 acquires a generated print data file and performs printing, the time period from when the printer 102 transmits a printing request to the print server 103 until the first document page starts being printed (first printing) can be shortened.

<Print Data Generation Sequence>

Processing in which the printer 102 transmits a printing request to the print server 103 and the printer 102 downloads print data generated by the print server 103 will be described below with reference to FIG. 5.

The pull print application 321 acquires document information managed by the print information management unit 332 of the print server 103 and displays the information on the operation panel 222 in a list form. The pull print application 321 receives an instruction to select a document ID and printing attributes through a user operation via the operation panel 222. The flowchart illustrated in FIG. 5 is started when a printing request is transmitted to the print server 103 based on the selection instruction through the user operation. The document ID and printing attributes included in a printing request are selected by the user via a document list screen (not illustrated) and a print setting screen (not illustrated) which are transmitted from the print server 103 to the pull print application 321.

In step S5.1.0, the pull print application 321 transmits a printing request including the document ID and printing attributes selected through the user operation, to the print server 103. When the web server 331 of the print server 103 receives the printing request, then in step S5.1.1, the print information management unit 332 issues a print job ID and generates print job information. In step S5.1.2, in response to the printing request received in step S5.1.0, the print server 103 transmits the issued print job ID to the printer 102.

When print job information is generated, in step S5.2.0, the print data generation unit 333 of the print server 103 generates the index file 400 and uploads the file to the storage server 104. The print information management unit 332 acquires a URL for accessing the index file 400 from the storage server 104 and registers the file to print job information (Table 2).

In step S5.2.1, the print information management unit 332 acquires the print target document data URL from the document information using the document ID in the print job information as a key, and the print data generation unit 333 accesses the document data URL to acquire document data. In the present case, the acquired document data is "pdf01".

In step S5.2.2, the print data generation unit 333 starts the print data generation processing based on the printing attributes included in the print job information. When the generated print data reaches a predetermined size, then in step S5.2.3, the print data generation unit 333 uploads the generated print data to the storage server 104 as files (print data files). The first print data file generated in the print data generation processing is "Pdl01-1".

In step S5.2.4, the print data generation unit 333 writes the data URL for acquiring the print data file uploaded in step S5.2.3, in an index file "index01". The index file 410 is an example of the index file in this case.

In step S5.2.2, the print data generation unit 333 continues the print data generation processing. In step S5.2.5, the print data generation unit 333 uploads the generated print data file (Pdl01-2). In step S5.2.6, the print data generation unit 333 adds the URL to the index file. The index file 420 is an example of the index file in this case.

In step S5.2.7, the print data generation unit 333 uploads the last print data file (Pdl01-3) to the storage server 104. In step S5.2.8, the print data generation unit 333 adds the data URL to the index file and updates a flag indicating the completion of the print data generation. The index file 430 is an example of the index file in this case.

Upon completion of the print data generation processing, then in step S5.2.9, the print information management unit 332 calculates a request hash value based on the document ID and printing attributes in the print job information (Table 2) and registers the request hash value in the print job information.

After reception of the print job ID in step S5.1.2, then in step S5.3.0, the pull print application 321 of the printer 102 acquires applicable print job information by using the print job ID as a key, from the print server 103. When the index file URL is included in the print job information acquired in step S5.3.0, then in step S5.3.1, the pull print application 321 accesses the index file URL to acquire the index file.

When the print server 103 has not yet uploaded the generated index file in step S5.2.0, the index file URL is not included in the print job information. In this case, the pull print application 321 repeats the processing for acquiring print job information in step S5.3.0 until print job information including the index file URL is acquired.

In step S5.3.2, the pull print application 321 references the index file 410 acquired in step S5.3.1 and, if the data URL of a print data file that has not been acquired exists in the data list, accesses the data URL of the print data file which has not been acquired in order to acquire the file. If the data URL of an print data file that has not been acquired does not exist in the data list and the value of the processing completion flag "end" is "false", then in step S5.3.1, the pull print application 321 reacquires an index file after a predetermined time period has elapsed and confirms the data list. The pull print application 321 repeats the processing in step S5.3.1 until the print data file which had not been acquired is confirmed in the acquired data list or until the value of the processing completion flag "end" changes to "true".

In steps S5.3.1 to S5.3.4, the pull print application 321 performs processing for acquiring an index file to acquire print data files. If the data URL of a print data file that has not been acquired does not exist in the data list, and the value "true" indicating the completion of processing is confirmed (index file 430), the pull print application 321 determines that the print data generation processing is completed and ends the processing for acquiring print data files. When the pull print application 321 accesses print data files (steps S5.3.2 to S5.3.4), the signature information to be transmitted during accessing is verified. The algorithm and key management at the time of verification are preset in the storage server 104.

While performing the processing for acquiring print data files, the pull print application 321 performs printing by transmitting the print data files to the print engine 221. The above descriptions have presented an account of the flow from the printing request transmission to the print processing.

<Processing (Sequence) for Reusing Print Data>

Processing for reusing generated print data files will be described below with reference to FIG. 6. The flowchart illustrated in FIG. 6 is performed after the flowchart illustrated in FIG. 5 has been performed, when the same printing request as the one illustrated in FIG. 5 is transmitted to the print server 103 in step S6.1.0. Processing steps equivalent to the above-described ones are assigned the same reference numerals, and descriptions thereof will be omitted.

In step S6.1.0, the web server 331 of the print server 103 receives a printing request from the pull print application 321. The printing attributes and document ID designated in this case are the same as those selected in step S5.1.0. In step S6.1.1 to S6.1.2, the print information management unit 332 of the print server 103 issues a print job ID, generates print job information, and transmits the information to the printer 102.

In step S6.2.0, the print information management unit 332 calculates a request hash value based on the document ID and printing attributes included in the printing request and references the print job information (Table 2) by using the request hash value as a key. As a result of the reference, when print job information including the same request hash value as the calculated request hash value is identified, the print information management unit 332 determines that the print data is reusable. On the other hand, when such print job information is not identified, the print information management unit 332 does not determine that reusable print data exists and performs processing in step S5.2.0 and subsequent steps.

In step S6.2.1, the print data generation unit 333 accesses the index file URL in the print job information including the same request hash value as the calculated request hash value and references the index file indicating generated print data files. The print data generation unit 333 requests the storage server 104 to reissue signed URLs for the print data files identified by the data URLs included in "dataList" in the index file referenced in step S6.2.1. In this case, the storage server 104 issues the signed URL based on a predetermined algorithm. In step S6.2.2, the print data generation unit 333 generates an index file "index02" including the reissued signed URL and uploads the index file to the storage server 104. The print information management unit 332 registers the index file URL of the generated index file "index02" in the print job information.

Table 2 illustrates the print job information (job-002) registered in this case. For example, assume that the document information included in the printing requests which are transmitted in steps S5.1.0 and S6.1.0 includes a document ID "doc-A" and printing attributes {"size"="A4", "color"="BW", . . . . The print job IDs issued for these printing requests are "job-001" and "job-002", respectively. With respect to the printing request in step S6.1.0, the print data files generated in step S5.1.0 are reusable but an index file is reissued. Therefore, in the print job information "job-002", a different index file (https://storage.com/Jobs/job-002/index.json) is registered for the same printing attributes and the request hash value. The above descriptions have presented an account of the processing performed when reusing print data.

By performing the processing illustrated in FIG. 6, the print server 103 can skip the print data generation processing, which makes it possible to reduce resources to be used in the storage server 104. In addition, an index file and signed URLs for accessing print data files are reissued, so that the printer 102 can download print data files while guaranteeing security.

<Processing for Reusing Print Data (Flowchart)>

Figure 7:
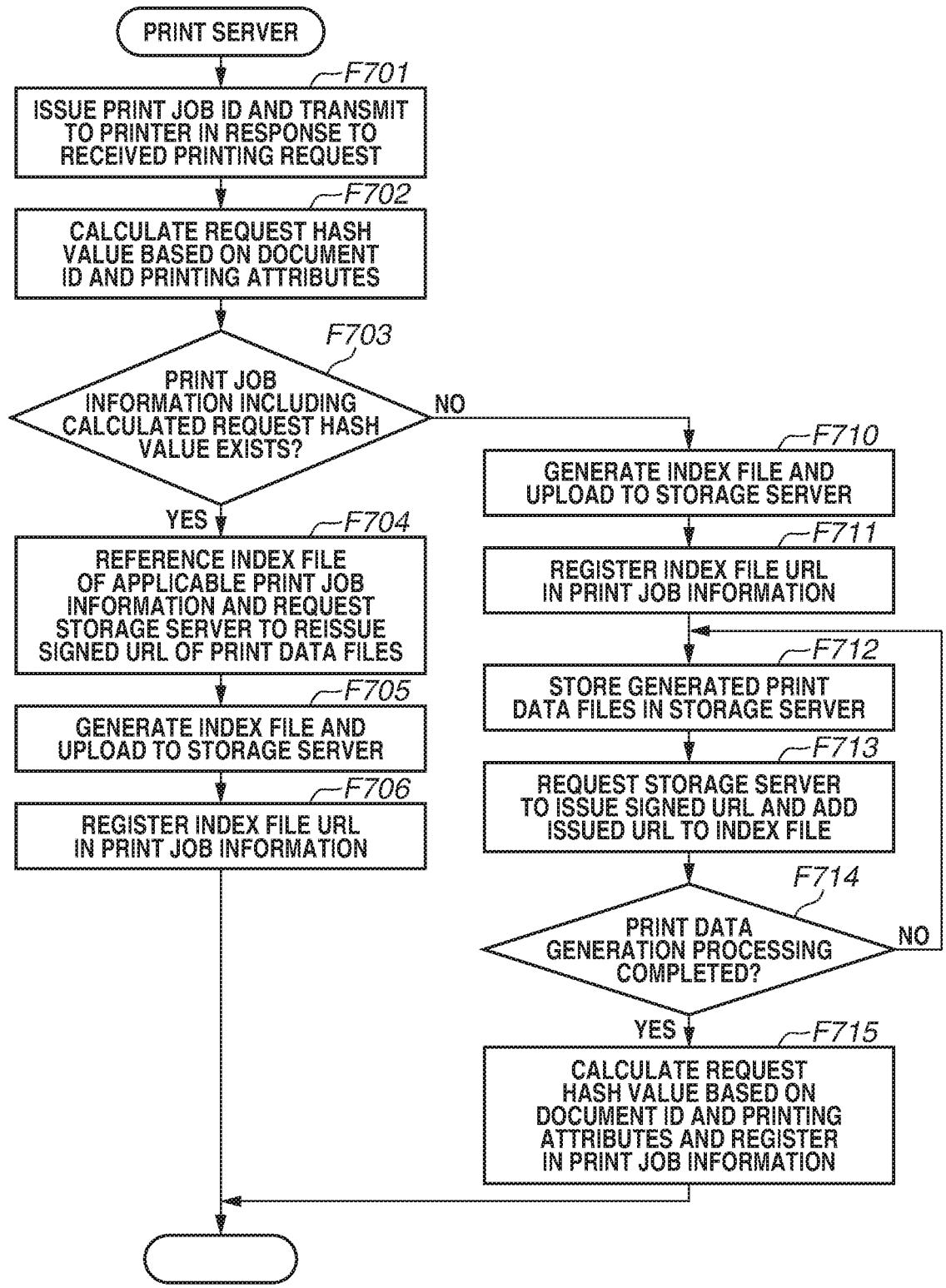
FIG. 7 is a flowchart illustrating print data reuse processing.

The following describes processing from when the print server 103 determines whether to reuse print data based on the printing request received from the printer 102, until the printer 102 puts the print data in a downloadable state (the print job information registered), with reference to FIG. 7. The flowchart illustrated in FIG. 7 is performed by the print server 103.

When the print server 103 receives a printing request, then in step F701, the print information management unit 332 issues a print job ID, generates print job information, and transmits the print job ID to the printer 102 as a response to the printing request. In step F702, the print information management unit 332 calculates a request hash value based on the document ID and printing attributes included in the printing request. In step F703, the print information management unit 332 determines whether print job information including the calculated request hash value exists.

If the print information management unit 332 determines that print job information including the calculated request hash value exists (YES in step F703), then in step F704 and subsequent steps, the print server 103 performs the processing illustrated in FIG. 6. Specifically, in step F704, the print data generation unit 333 of the print server 103 references the index file in the print job information and requests the storage server 104 to reissue signed URLs of print data files. More specifically, the print data generation unit 333 references the index file and acquires the file path of each print data file. Then, the print data generation unit 333 transmits, as a signed URL reissuance request, the acquired file path and authority information for enabling a client (the printer 102 at the present time) to download a file (an index file at the present time), to the storage server 104. After verifying the authority information, the storage server 104 reissues signed URLs based on the acquired file path and authority information.

In step F705, the print data generation unit 333 generates a new index file in which the signed URLs reissued in step F704 are included in "dataList" and uploads the new index file to the storage server 104. In the present case, an index file containing the data URLs of the print data files Pdl01-1 to Pdl01-3 is uploaded. However, this index file "index02" is different from the index file 430 because signed URLs have been reissued. An index file 440 illustrated in FIG. 4 indicates an example of the index file "index02" containing the reissued signed URLs. Since signed URLs are issued for the new print job (job-002), "job- . . . " and the signature information in the URLs differ from those in the index file "index01" illustrated in FIG. 4.

In step F706, the print data generation unit 333 registers the index file URL in the print job information and ends the processing.

Figure 5:
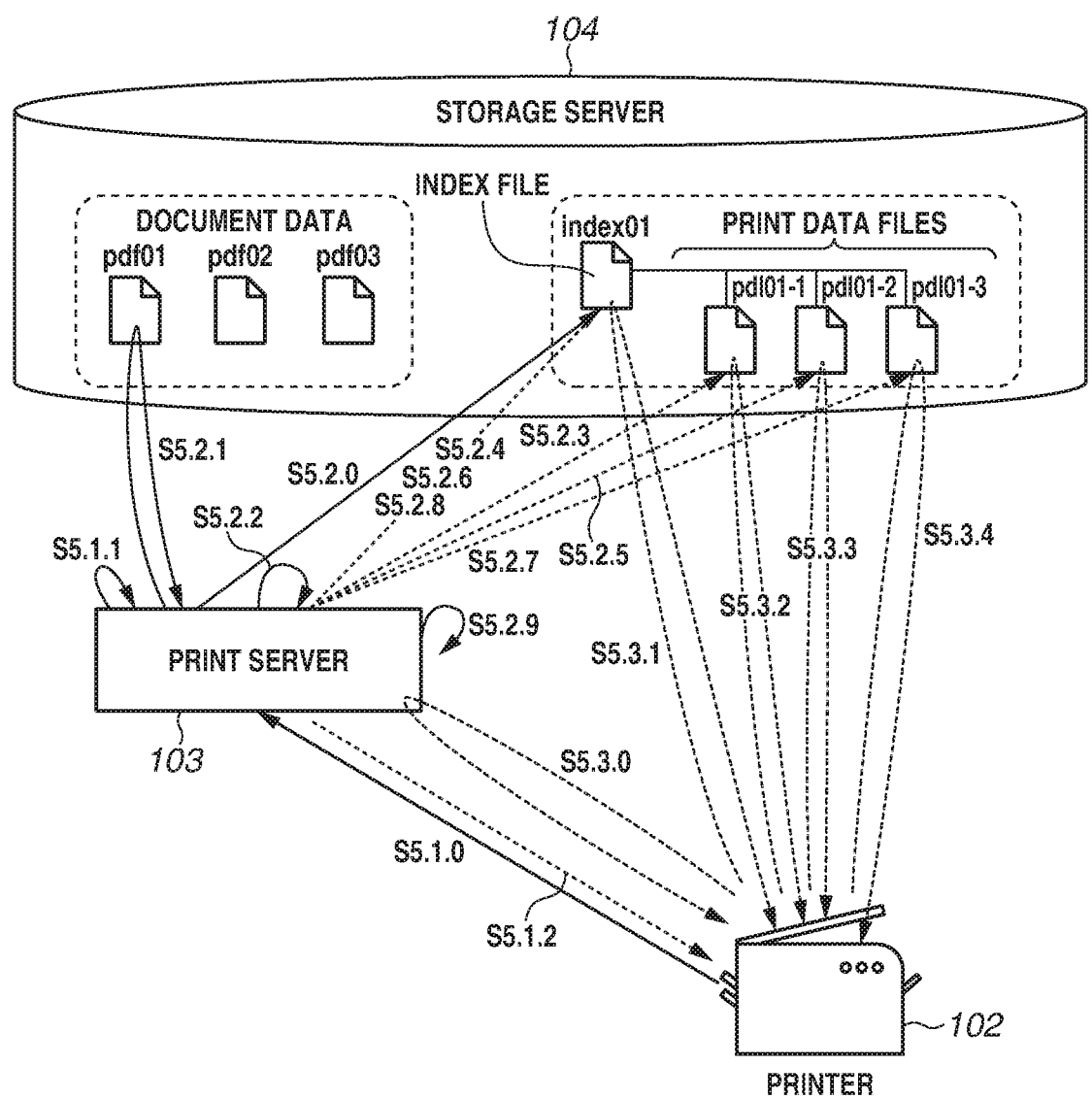
FIG. 5 illustrates a print data generation sequence.
Figure 6:
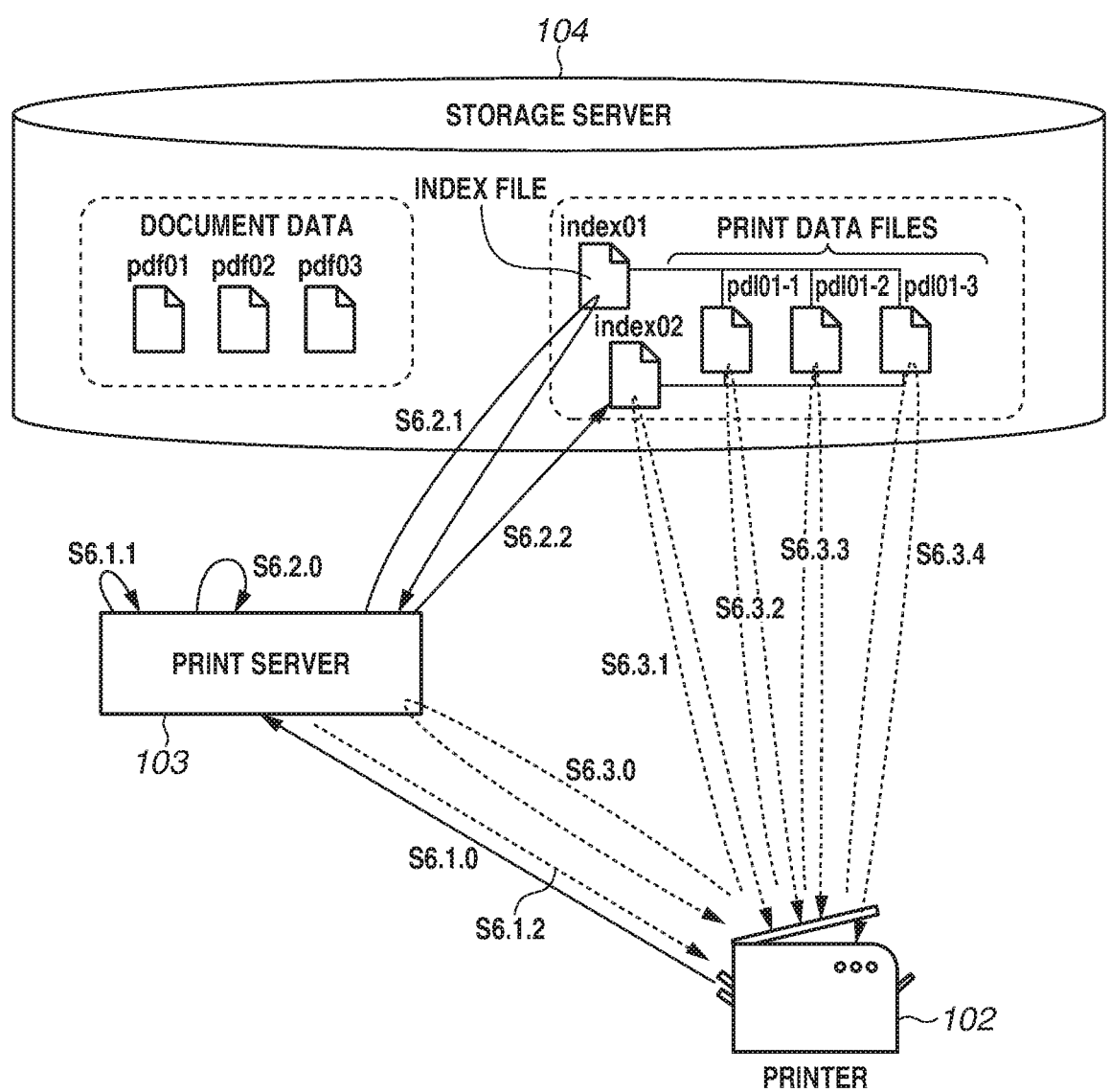
FIG. 6 illustrates a print data reuse sequence.

On the other hand, if the print information management unit 332 does not determine that print job information including the calculated request hash value exists (NO in step F703), then in step F710, the print server 103 performs the processing illustrated in FIG. 5. More specifically, in step F710, the print data generation unit 333 generates a new index file 400 and uploads the new index file to the storage server 104. In step F711, the print data generation unit 333 registers the index file URL in the print job information. In step F712, the print data generation unit 333 starts the print data generation processing and, when print data files having a predetermined size are generated, the print data generation unit 333 stores the generated files in the storage server 104. In step F713, the print data generation unit 333 requests the storage server 104 to issue signed URLs which are the acquisition sources of the print data files stored in step F712, and adds the issued URL to "dataList" in the index files 410 to 420. At this timing, if the print data generation is completed, the print data generation unit 333 changes the processing completion flag in the index file to "true". In step F714, the print data generation unit 333 determines whether the print data generation processing is completed. The processing in steps F712 and F713 is repeated until it is confirmed that the print data generation processing is completed in step F714.

When the print data generation unit 333 confirms that the print data generation processing is completed (YES in step F714), then in step S715, the print information management unit 332 calculates a request hash value based on the document ID and printing attributes included in the printing request and registers the request hash value in the print job information. By using the hash value which uses the document ID and printing attributes, comparison of a plurality of elements can be performed through one time processing.

The above descriptions have presented an account of the processing for registering the print job information by the print server 103 which received a printing request. When the printer 102 acquires an index file and print data files based on the registered print job information, the printer 102 can perform print processing.

Through the above-described processing, resources of the storage server 104 for storing print data can be efficiently used. In addition, by reissuing the signed URL, security can be protected and print data is prevented from being abused.

A second exemplary embodiment will be described below centering on processing for reusing print data without reissuing an index file for acquiring print data files. Portions not described in the present exemplary embodiment are similar to those according to the first exemplary embodiment.

Table 4 illustrates an example of print job information (2) managed by the print information management unit 332 and stored in the storage 334.

TABLE 4

| Print Job ID | Document ID | Printing Attributes | Index File URL | Request Hash Value | Print Data Generation Time |
|---|---|---|---|---|---|
| job-001 | doc-A | {"size"="A4", "color" ="BW", . . . | https://storage.com/Jobs/job-001/index.json | EA84ABCFF88DDB | Nov. 1, 2017 at 7:41 p.m. |
| job-002 | doc-A | {"size"="A4", "color" ="BW", . . . | https://storage.com/Jobs/job-001/index.json | — | — |
| job-003 | doc-B | {"size"="A3", "color" ="CL", . . . | https://storage.com/Jobs/job-003/index.json | WE9HN70SEA8WEO | Oct. 31, 2017 at 4:34 a.m. |

The print job information (2) includes "Print Data Generation Time" in addition to the print job information according to the first exemplary embodiment. "Print Data Generation Time" denotes the time when a request hash value is registered in the print information management unit 332 after completion of the print data generation processing.

<Flow of Reusing Print Data According to Present Exemplary Embodiment>

Figure 8:
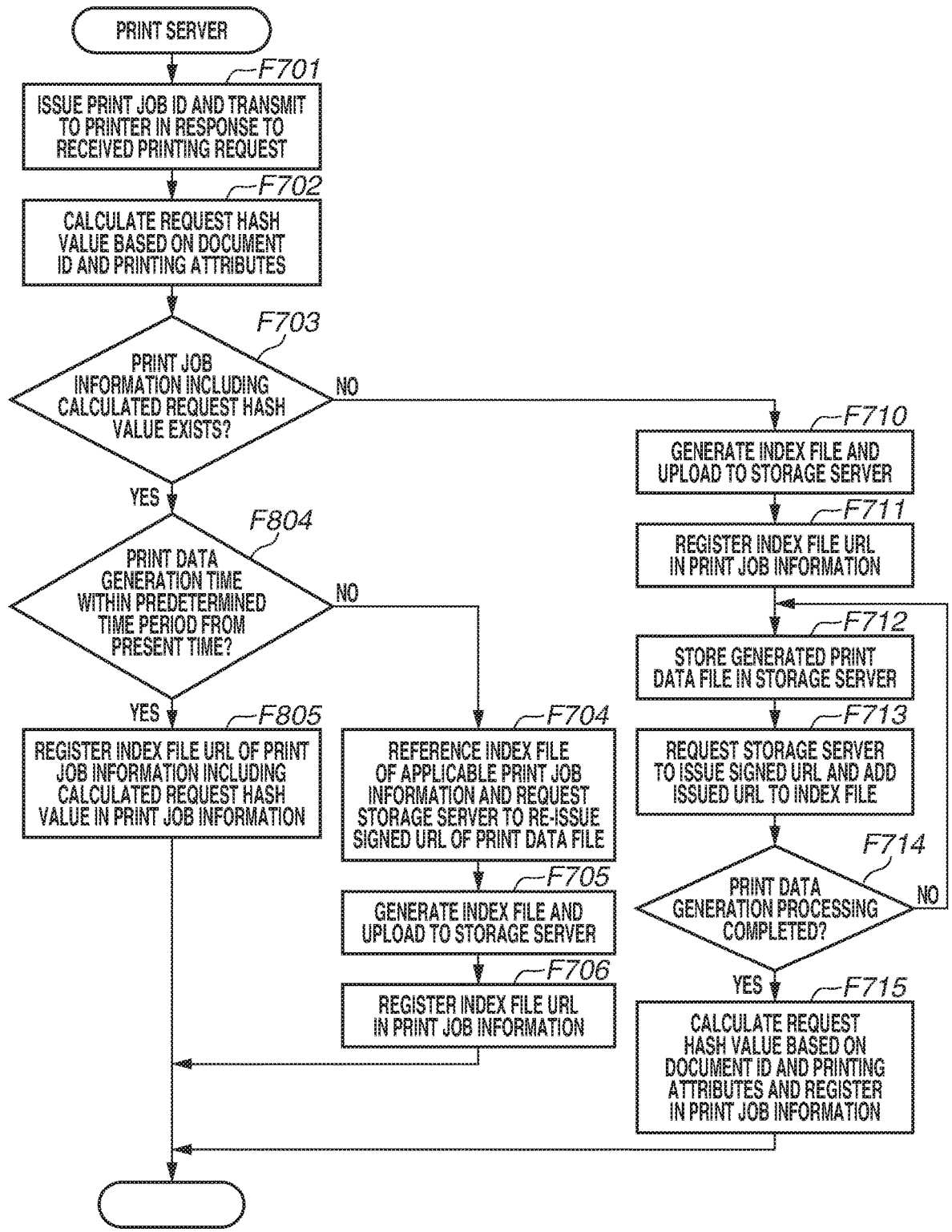
FIG. 8 is a flowchart illustrating print data reuse processing according to a second exemplary embodiment.

A flow of reusing print data according to the present exemplary embodiment will be described below with reference to FIG. 8. However, steps which have been described above with reference to FIG. 7 are assigned the same reference numerals and descriptions thereof will be omitted.

When the print information management unit 332 confirms that print job information including the calculated request hash value exists (YES in step F703), then in step F804, the print information management unit 332 compares the print data generation time in the print job information (2) with the present time to determine whether the print data generation time is within a predetermined time period from the present time. When the print information management unit 332 determines that the print data generation time is within the predetermined time period from the present time (YES in step S804), then in step S805, the print information management unit 332 registers the index file URL of the print job information including the calculated request hash value, as the index file URL of the print job information of the printing request (step S6.1.0), without reissuing a signed URL. Then, the print information management unit 332 ends the processing.

The above descriptions have presented an account of the processing for registering print job information according to the second exemplary embodiment. When the printer 102 acquires an index file and print data files based on registered print job information, the printer 102 can perform print processing.

Table 4 illustrates an example of print job information when step F805 is executed. The print job "job-002" having the same document ID and same printing attributes as those of the print job "job-001" has the same index file URL setting "https://storage.com/Jobs/job-001/index.json" as that of the print job "job-001".

This enables the pull print application 321 to acquire print data files that have already been issued in the flowchart illustrated in FIG. 5 by using the index file that has already been issued in the flowchart illustrated in FIG. 5. In addition, by managing the print data file generation time, not only an index file can be reused but also a valid index file can be prevented from being managed by the storage server 104 for a prolonged period of time.

While, in the present exemplary embodiment, the print server 103 determines whether an index file is to be reused based on the time when the request hash value is registered, the base time for reusing an index file is not limited thereto. Any method for determining the reuse of an index file is applicable as long as the signature information of the URL described in the index file can be validated.

A third exemplary embodiment will be described below. To reduce the management cost of print data files in the storage server 104, a storage expiration date may be provided for print data files. More specifically, when making an attempt to reissue or reuse index files as described in the first and the second exemplary embodiments, no print data file may exist in the storage server 104. The present exemplary embodiment will be described below centering on processing to be performed when a storage expiration date is set to the print data files. Portions not described in a third exemplary embodiment are similar to those according to the first and the second exemplary embodiments.

Table 5 illustrates an example of file information (2) managed by the file information management unit 342.

TABLE 5

| Data URL | File Path | Storage Expiration Date |
|---|---|---|
| https://storage.com/docs/doc-A/data.pdf | /docs/doc-A/data.pdf | Nov. 4, 2017 at 3:00 a.m. |
| https://storage.com/docs/doc-B/data.pdf | /docs/doc-B/data.pdf | Nov. 3, 2017 at 1:00 a.m. |
| https://storage.com/Jobs/job-001/index.json | /Jobs/job-001/index.json | Nov. 1, 2017 at 8:44 p.m. |
| https://storage.com/Jobs/job-001/data1.pd1 | /Jobs/job-001/data1.pd1 | Nov. 1, 2017 at 8:45 p.m. |
| https://storage.com/Jobs/job-001/data2.pd1 | /Jobs/job-001/data2.pd1 | Nov. 1, 2017 at 8:46 p.m. |

The file information (2) includes "Storage Expiration Date" in addition to the file information described in the first exemplary embodiment. The storage expiration date refers to a storage expiration date of a file having a data URL as the acquisition source. In particular, "Storage Expiration Date" of the file paths "/Jobs/job-001/data-1.pdl" and "/Jobs/job-001/data-2.pdl" indicates the storage expiration date of print data files.

When print data files are updated, the file information management unit 342 adds a storage expiration date determined by the storage server 104, to the last update time of the print data files and records the resultant storage expiration date. The file information management unit 342 deletes the file information of which the storage expiration date becomes earlier than the present time, from the file information (2).

<Storage Life Cycle Check Sequence>

Figure 9:
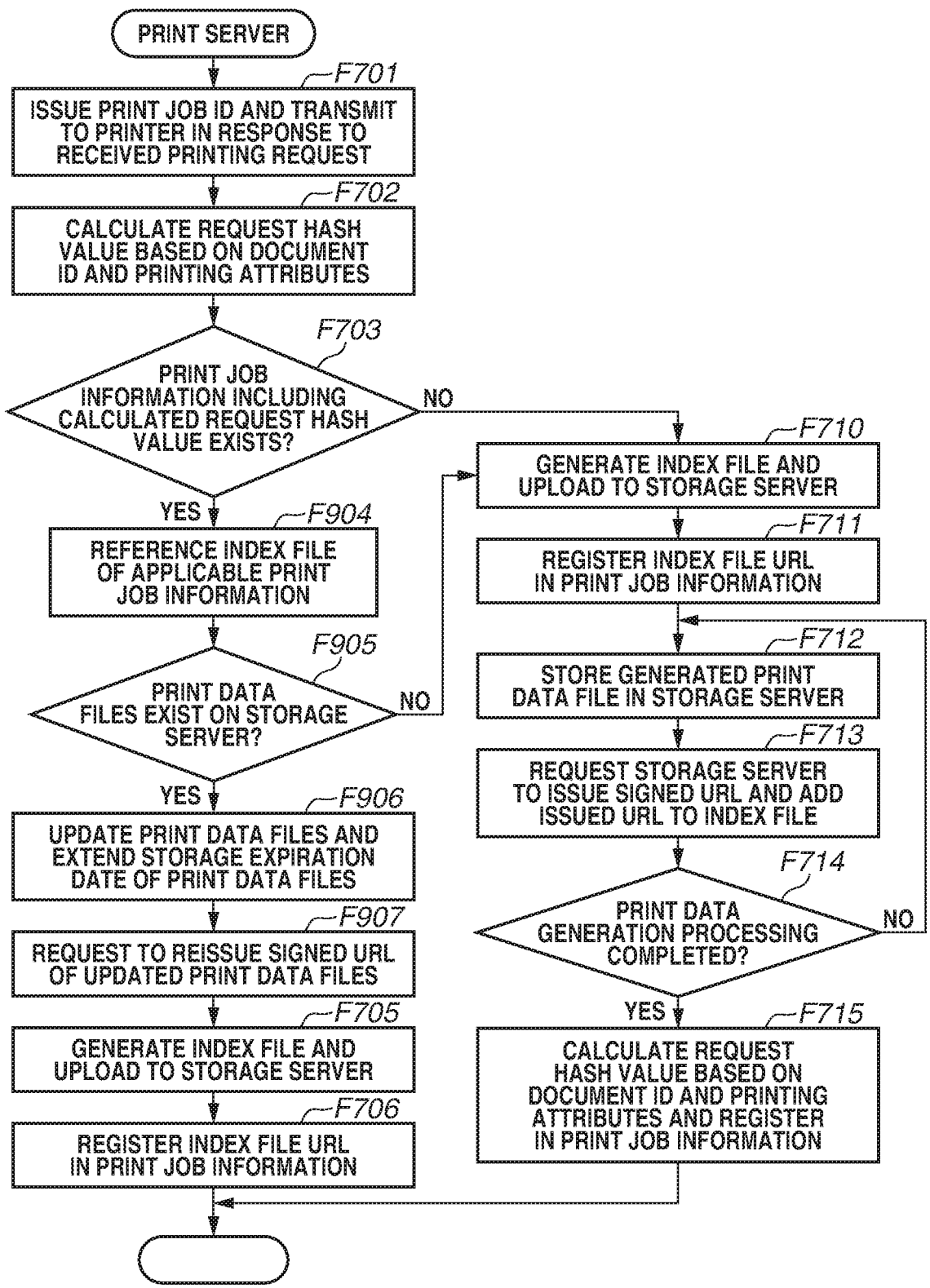
FIG. 9 is a flowchart illustrating a life cycle flow of a storage server according to a third exemplary embodiment.

A life cycle flow of the storage server 104 will be described below with reference to FIG. 9. The above-described flow is assigned the same reference numerals, and descriptions thereof will be omitted.

When the print information management unit 332 confirms that the print job information includes the request hash value calculated based on the document ID and printing attributes included in the printing request (step S6.1.0) (YES in step F703), then in step F904, the print data generation unit 333 references the index file of the applicable print job information. The index file to be referenced in this case may be either the index file "index01" before reissuance or the index file "index02" after reissuance as long as the existence of print data files can be confirmed. According to the present exemplary embodiment, the index file to be referenced in step F904 is the index file "index01" before reissuance.

In step F905, when the print data generation unit 333 references the index file, the print data generation unit 333 accesses the print data file URLs included in "dataList" to confirm the existence of print data files. If the print data generation unit 333 cannot confirm the existence of print data files (NO in step F905), then in step F710, the print data generation unit 333 generates an index file. More specifically, the processing in steps S5.2.1 to S5.2.9 illustrated in FIG. 5 is performed. Example cases when the print data generation unit 333 accesses the index file URL in step F904 and cannot confirm that applicable print data files exist in the storage server 104 in step F905 include a case where print data files have been deleted from the storage server 104 because the storage expiration date has expired.

On the other hand, when the print data generation unit 333 confirms that applicable print data files exist (YES in step F905), in step F906, the print data generation unit 333 updates the print data files to extend the storage expiration date thereof. More specifically, the processing for updating print data files includes acquiring print data files based on the index file referenced by the print data generation unit 333 in F904, and uploading the acquired print data files to the storage server 104 again. Since the storage server 104 allocates the same storage area to the same file name, the file path and signature information applied thereto remain unchanged even after the print data files are uploaded again in the processing in step F906.

In step F907, as a result of updating the print data files, the print data generation unit 333 acquires the signed URLs of the updated print data files from the storage server 104. In step F705, the print data generation unit 333 uploads the index file describing the updated signed URLs to the storage server 104. The above descriptions have presented an account of the processing for updating the print data files according to the present exemplary embodiment.

According to the present exemplary embodiment, when a storage expiration date is set to the print data files stored in the storage server 104, by updating the print data files and issuing a signed URL, the print data files can be prevented from being deleted before the printer 102 acquires the print data files.

Instead of periodically updating the print data files, the storage server 104 updates the print data files applicable to the printing request to enable restricting of the operation load on the storage server 104.

A fourth exemplary embodiment will be described below. According to the third exemplary embodiment, the storage server 104 updates the print data files applicable to the printing request or generates print data files applicable thereto to prevent an error from occurring when the printer 102 acquires the print data files. The present exemplary embodiment will be described below centering on processing for requesting the print server 103 to regenerate print data if the printer 102 cannot acquire print data files from the print server 103. The processing according to the present exemplary embodiment can also be performed in combination with the first to the third exemplary embodiments. The following describes only portions which are different from those according to the first to the third exemplary embodiments.

<Request for Regenerating Print Data from Printer 102>

The processing for requesting the print server 103 to regenerate print data will be described below with reference to FIG. 10. This processing is triggered if, at the time of acquiring print data files, the pull print application 321 of the printer 102 cannot acquire the print data files in steps S5.3.2 to S5.3.4 illustrated in FIG. 5 or in steps S6.3.2 to S6.3.4 illustrated in FIG. 6 because of an error returned from the storage server 104. As one of reasons why the print data files cannot be acquired the print data files may have been deleted from the storage server 104 because the storage expiration date set for the print data files has expired.

Upon reception of an error from the storage server 104, in step F1000, the pull print application 321 transmits a print data regeneration request including the print job ID acquired from the print server 103, to the print server 103.

Upon reception of the print data regeneration request, in step F1001, the web server 331 of the print server 103 identifies the applicable document ID based on the received print job ID. In step F1002, the print data generation unit 333 identifies an URL (document data URL) as the acquisition source of the document data based on the document information (Table 1) and the document ID. The print data generation unit 333 accesses the document data URL to acquire the document data and generates print data files in the processing in step F712 and subsequent steps. The above descriptions have presented an account of the processing when the printer 102 transmits a print data regeneration request.

According to the present exemplary embodiment, if the printer 102 cannot acquire a certain specific print data file (Pdl101-2), for example, the printer 102 transmits a print data regeneration request to the print server 103. Then, all of the print data files (Pdl101-1 to Pdl101-3) will be regenerated.

Even if print data files cannot be acquired from the printer 102 because the print data files have been deleted from the storage server 104, through the processing according to the present exemplary embodiment, the printer 102 can continue print processing by regenerating the print data files. This processing enables regenerating and reacquiring of the print data which could not be acquired, while continuing the printing of the successfully acquired print data.

In the above-described exemplary embodiments, the hash values generated based on the document ID and printing attributes which are included in a printing request are compared. However, it is not necessary to retain a hash value if the identification of the generated print data can be confirmed based on the contents of a printing request. In that case, it is possible to simply compare request information or calculate a hash value at the time of comparison. In addition, information to be used for comparison only needs to include elements affecting the print data to be generated and is not limited to the document ID and printing attributes.

According to the above-described exemplary embodiments, a new index file "index02" different from the existing index file "index01" is reissued (FIG. 6) in order to manage one index file for each print job ID. However, a new signed URL issued in step F704 may be overwritten with the index file index01 without generating a new index file.

According to the above-described exemplary embodiments, a printing request is transmitted to the print server 103 via a user interface (UI) displayed on the printer 102. However, the form of embodiment is not limited thereto. A document list screen or a print setting screen may be displayed on a web browser of a personal computer (PC), and the user selects a document or setting. In this case, unlike the form in which the printer 102 transmits a printing request and performs print processing, a screen for selecting a printer for performing printing needs to be displayed on the web browser.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-048252, filed Mar. 15, 2018, which is hereby incorporated by reference herein in its entirety.

What is claimed is:

1. A print server for converting document data into print data including a plurality of print data files, the print server comprising:
    one or more memories storing at least one program of instructions;
    and one or more processors that execute the at least one program of instructions to cause the print server to perform operations comprising:
        managing a first condition designated by a first printing request for performing print processing for the document data, and acquisition source information for acquiring print data files generated based on the first printing request, the acquisition source information including first signature information; and
        determining whether the first condition is identical to a second condition designated by a newly received second printing request,
    wherein, when the determining determines that the first and the second conditions are identical, the managing manages acquisition source information of the print data files generated based on the first printing request, the acquisition source information including reissued second signature information.

2. The print server according to claim 1,
wherein, when the determining determines that the first and the second conditions are not identical, the print server generates new print data files based on the second printing request, and
wherein the managing manages the acquisition source information of the new print data files and the second condition.

3. The print server according to claim 1,
wherein the first condition includes document identification information for uniquely identifying the document data, and printing attributes as print setting information for the print data,
wherein the managing manages a first hash value calculated by using the document identification information and the printing attributes, and wherein the determining determines whether the first hash value is identical to a second hash value calculated based on the document identification information and the print setting information included in the second printing request.

4. The print server according to claim 1,
wherein the acquisition source information are Uniform Resource Locators (URLs) issued by a storage server for storing the print data files in response to a request from the print server, the URL including signature information issued by the storage server, and
wherein the one or more processors execute the at least one program of instructions to cause the print server to acquire the URL from the storage server.

5. The print server according to claim 1,
wherein the one or more processors execute the at least one program of instructions to cause the print server to perform confirming that confirms, after the determining determines whether the first and the second conditions are identical, whether the first signature information is valid, and
wherein, when the confirming confirms that the first signature information is valid, the managing manages acquisition source information of the print data files generated based on the first printing request and the second condition in association with each other, the acquisition source information including the first signature information.

6. The print server according to claim 5, wherein, when the confirming does not confirm that the first signature information is valid, the managing manages the acquisition source information including the reissued second signature information and the second condition in association with each other.

7. The print server according to claim 5,
wherein the first hash value calculated based on the first condition is time registered in the print server, and
wherein the confirming confirms whether the time is within a predetermined time period from the present time.

8. The print server according to claim 1,
wherein the one or more processors execute the at least one program of instructions:
    to cause the print server to perform confirming that confirms, after the determination unit determines whether the first and the second conditions are identical, whether the print data files generated based on the first printing request are stored in a storage server, and
    to cause, in a case where the confirming confirms that the print data files are stored in the storage server, the print server to store again the print data files confirmed to have been stored by the confirming.

9. The print server according to claim 1,
wherein the acquisition source information for acquiring the print data files are described in an index file, and
wherein the managing manages URLs as acquisition source information for acquiring the index file.

10. The print server according to claim 9,
wherein the index file is a first index file describing acquisition source for acquiring the print data files generated based on the first printing request, the acquisition source including the first signature information, and
wherein the index file is a second index file describing acquisition source for acquiring the print data files generated based on the first printing request, the acquisition source including the second signature information.

11. The print server according to claim 1, wherein the one or more processors execute the at least one program of instructions to cause the print server to transmit to a transmission source of the second printing request, a storage destination of the index file describing the acquisition source including the second signature information, to a transmission source of the second printing request.

12. A method for controlling a print server for converting document data into print data including a plurality of print data files, the method comprising:
  managing a first condition designated by a first printing request for performing print processing of the document data, and acquisition source information for acquiring print data files generated based on the first printing request, the acquisition source information including first signature information; and
  determining whether the first condition is identical to a second condition designated by a newly received second printing request,
  wherein, in a case where it is determined that the first and the second conditions are identical in the determining, acquisition source information of the print data files generated based on the first printing request are managed in the managing, the acquisition source information including reissued second signature information.

13. A non-transitory storage medium storing at least one program that when, executed by one or more processors, controls the one or more processors to perform operations comprising:
  managing manage a first condition designated by a first printing request for performing print processing for document data, and acquisition source information for acquiring print data files generated based on the first printing request, the acquisition source information including first signature information; and
  determining determine whether the first condition is identical to a second condition designated by a newly received second printing request,
  wherein, when the determining determines that the first and the second conditions are identical, the managing manages acquisition source information of the print data files generated based on the first printing request, the acquisition source information including reissued second signature information.

14. The print server according to claim 1, wherein the one or more processors execute the at least one program of instructions to cause the print server to reissue the acquisition source information including the second signature information after verifying authority information about a printer.

* * * * *